Figure 1:
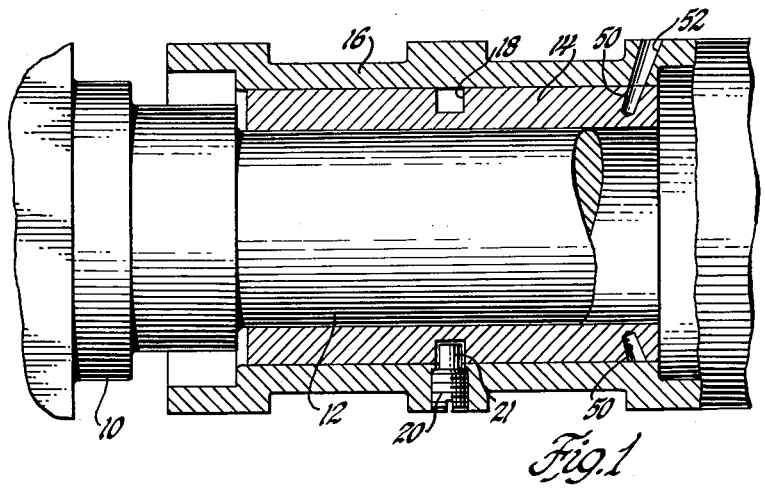

Aug. 20, 1963     J. C. McEWEN     3,101,222
BEARING ASSEMBLY
Filed Feb. 2, 1962

INVENTOR.
John C. McEwen
BY
R. J. Wallace
ATTORNEY 3,101,222
BEARING ASSEMBLY
John C. McEwen, Indianapolis, Ind., assignor to General Motors Corporation, Detroit, Mich., a corporation of Delaware
Filed Feb. 2, 1962, Ser. No. 170,672
8 Claims. (Cl. 308—58)

This invention relates to a bearing assembly and more particularly to an auto-indexable bearing assembly in which a cylindrical plain bearing is self-indexed one-half revolution each time the rotation of the journal being supported is reversed.

In bearing assemblies where a cylindrical bearing is employed, it is frequent that one portion of the surface is subject to maximum wear while a diametrically opposite portion of the surface is subject to comparatively little, if any, wear. In such intance, failure of the bearing can result from excessive wear of the first portion, leaving the diametrically opposite portion virtually unworn. When the bearing is replaced because of wear on the first portion, of course, the relatively unused portion is scrapped.

I have found that the life of such a bearing can be prolonged by distributing the wear between both of the bearing portions referred to. Hence, an object of the invention is to provide means for prolonging the life of cylindrical plain bearings.

It is a further object of the invention to provide a means whereby a cylindrical plain bearing is automatically rotated each time the journal it supports reverses its direction of rotation. Another object of the invention is to provide a means for rapidly temporarily repairing a "hot box" condition of a railroad journal bearing that obviates the necessity for replacing the bearing while a train is en route to its destination.

The objects of the invention are attained with a plain bearing assembly having a self-actuating bearing rotating mechanism which engages and disengages with the journal the bearing supports. When the bearing rotation is one-half revolution, diametrically opposed portions of the bearing exchange positions in the assembly. The assembly encompasses a plain bearing which is rotatably mounted on a bearing support. This bearing has a recess in the surface thereof which contacts the rotating journal. The recess has an element therein which is movable transverse to the bearing, generally tangentially to the surface of the journal. Resilient means are provided to bias the element against the journal as it passes from one side of the recess to the other substantially tangentially to the surface of the journal. Means are provided to bias the element into mutual contact with the resilient means and the journal surface. Rotation of the journal in one direction moves the bearing rotating element into a semi-binding relationship between the journal with the resilient means, while rotation of the journal in the opposite direction leaves the element in non-bound disposition. The semi-binding engagement of the element between the journal and the resilient means makes the overall rotation resistance between the journal and the bearing greater than that between the bearing and its supporting housing. Hence, rotation of the bearing on its support results in moving the bearing into a new position and prolonging its life.

Figure 2:
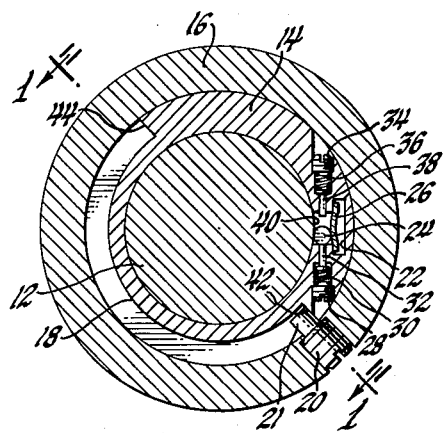
Figure 3:
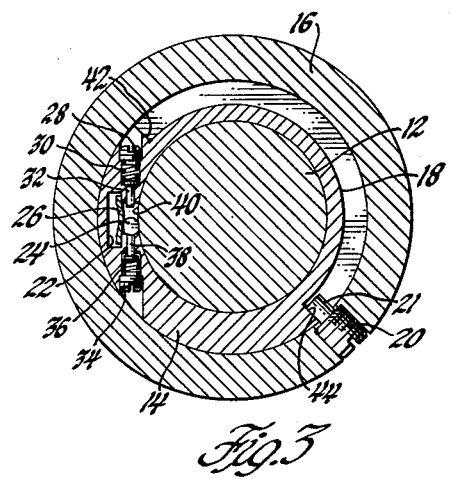
Figure 4:
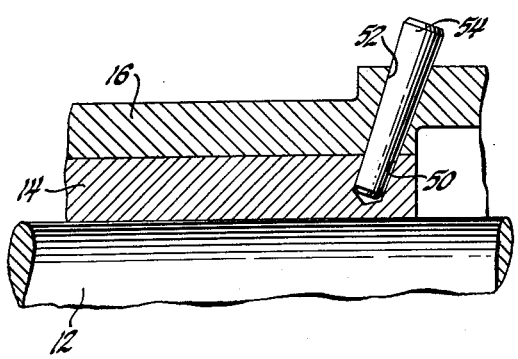

Other objects, features and advantages of the invention will become more apparent from the following description of a specific embodiment thereof which is hereinafter more fully described in connection with the drawings, in which:

FIGURE 1 shows a longitudinal sectional view of a bearing assembly taken along the line 1—1 of FIGURE 2;

FIGURE 2 contains a transverse sectional view of a bearing assembly made in accordance with the invention, as it is disposed when the journal is rotating clockwise;

FIGURE 3 shows a transverse sectional view of the bearing assembly shown in FIGURE 2, as it is disposed when the journal is rotating counterclockwise; and FIGURE 4 is an enlarged fragmentary view of a portion of the bearing assembly locked, limiting the bearing to no rotation.

My bearing assembly is particularly adaptable for use as a railroad journal bearing assembly, such as illustrated in connection with FIGURE 1. There is shown an axle member 10 having a journal portion 12 thereof rotatably supported within a cylindrical plain bearing 14. The plain bearing 14 is, in turn, rotatably supported in a cylindrical housing 16. The surface of the bearing which is in contact with the housing member 16 has a semi-circumferential groove 18 therein. A threaded pin 20 is secured to the housing member and has a portion 21 thereof which extends into the groove 18.

As can be seen in FIGURES 2 and 3, the surface of the bearing which is in contact with the journal 12 has a recess 22 therein which contains a roller, the bearing rotating element 24. The recess 22 is T-shaped in cross section wherein the base portion of the T has sufficient lateral extremity to permit the element 24 to shift transversely with respect to the bearing, or tangentially to the journal periphery. A book spring 26 in the cross bar portion of the recess 22 biases the roller 24 against the journal as the roller shifts from one side of the recess to the other. The roller is not biased against the journal by the book spring 26 when it is disposed in either lateral extremity of the recess. Only when it is in the intermediate position is it so biased.

A set screw 28 retains a light coil spring 30 against a plunger element 32 which, in turn, biases the roller 24 into mutual contact with the journal surface and the book spring 26. Another set screw 34, spring 36 and plunger 38 similarly bias the element 24 between the journal and the book spring 26 when the element is on the opposite side of the recess, as shown in FIGURE 3.

Again in reference to FIGURE 2, when the journal 12 is rotating clockwise, the roller 24 is in light sliding contact with the journal surface and is also in light engagement with the book spring 26. This rotation maintains the roller in a non-bound position. However, as the rotation of the journal reverses to a counterclockwise direction, the roller is urged by the journal surface 40 against the book spring 26 into a semi-binding relationship. This action is facilitated, of course, by the biasing plunger 32. This semi-binding relationship between the journal surface 40, the roller 24 and the book spring 26 increases the rotation resistance between the journal 12 and the bearing 14. This wedging of the roller against the book spring is sufficient to make the rotation resistance between the bearing and the journal greater than between the bearing and the housing. Hence, rotation of the bearing relative to its support, housing 16, results by continued counterclockwise rotation of the journal.

As the journal continues to rotate the bearing relative to its support, the boss member 21 moves in the semi-circumferential groove 18 from abutment with end wall 42 into abutment with the groove end wall 44. As the boss member 21 abuts end wall 44, the bearing 14 can no longer move in a counterclockwise direction with the journal 12.

Attention is now drawn to FIGURE 3. When the boss 21 abuts groove end wall 44, the impetus of continued counterclockwise journal rotation urges the roller element 24 against the book spring with even greater force. The book spring deforms and the roller passes to the opposite side of the recess into contact with plunger 38. In this position, the roller is also biased into mutual contact with the book spring and the journal, but this time by plunger 38. However, the roller remains out of the semi-binding position between the journal and the book spring so long as the journal continues to rotate in a counterclockwise direction. When the journal is rotated clockwise, the roller element is again moved into the semi-binding intermediate position whereupon the bearing is indexed back into the position shown in FIGURE 2.

It is to be understood, of course, that while the book spring 26 is preferred as the resilient means for producing the semi-binding engagement in the intermediate roller position, other resilient means may be preferred for some applications. Analogously, a leaf spring, corrugated or arcuate, can be disposed in the recess in place of the plunger biasing means to maintain the roller in mutual contact with the journal and the resilient means.

In some instances, it may be desired to rotate the bearing into a given position and lock it there, so that regardless as to which direction the journal rotates, the bearing will not index. Should a "hot box" condition on a railroad car occur when using my bearing assembly, producing damage to the upper portion of the bearing, it can readily be temporarily repaired. The lower portion of the bearing, which is still in satisfactory operating condition, can be indexed to the top, locked in place and the bearing repaired at a later time. This, of course, would be accomplished merely by moving the car appropriately, e.g., backing it up, to index the bearing, locking the bearing in place and then continuing the journey. As shown in FIGURES 1 and 4, the locking can be achieved using diametrically opposed bearing bores 50, each of which, respectively, registers with a housing bore 52 when the bearing is fully indexed into either of the two positions. When one of the bores 50 is registered with the housing bore 52, a locking pin 54 can be inserted therein to limit the bearing to no rotation regardless as to the direction of journal rotation. When so locked, the initial rotating action of the journal which would otherwise index the bearing would merely shift the roller element 24 across the recess 22 over the book spring 26.

It is to be understood that although the invention has been described in connection with certain specific examples thereof, no limitation is intended thereby except as defined in the appended claims.

I claim:

1. In a bearing assembly, a cylindrical plain bearing for rotatably supporting a journal, means for rotatably supporting said bearing, means for limiting the rotation of said bearing within said bearing support means so that said bearing never can make a complete revolution in either direction, and means for inducing rotation of said bearing relative to said bearing support means within the bounds of said limiting means.

2. In a bearing assembly, a cylindrical plain bearing for rotatably supporting a journal, means for rotatably supporting said bearing, means for positively stopping rotation of said bearing relative to said bearing support means so that said bearing is prevented from ever making a full revolution in either direction, means for locking said bearing to said journal for coaxial rotation therewith, and means for releasing said locked bearing from said journal by engagement of said bearing with said stopping means.

3. In a bearing assembly, a cylindrical plain bearing for rotatably supporting a journal, means for rotatably supporting said bearing, means for limiting the rotation of said bearing within said bearing support means so that said bearing never can make a full revolution in either direction, a recess in the surface of said bearing contacting said journal, and a bearing rotating means in said recess, said bearing rotating means being engageable by rotation of said journal and disengageable by continued rotation of said journal after rotation of said bearing is stopped by said limiting means.

4. In a bearing assembly, a cylindrical plain bearing for rotatably supporting a journal, means for rotatably supporting said bearing, a semi-circumferential groove in the surface of said bearing adjacent said support, a boss on said support projecting into said groove, registered bores in said bearing and said support for receiving a locking pin to limit relative movement therebetween, a recess in the bearing surface contacting said journal, a bearing rotating element in said recess, resilient means in said recess for contact with said element, and means for biasing said element into mutual contact with said journal and said resilient means so that rotation of said journal frictionally locks said element between said journal surface and said resilient means to rotate said bearing relative to said support.

5. In a bearing assembly, a cylindrical plain bearing for rotatably supporting a journal, means for rotatably supporting said bearing, a semi-circumferential groove in the surface of said bearing adjacent said support, a boss on said support projecting into said groove, registered bores in said bearing and said support for receiving a locking pin to limit relative movement therebetween, a recess in the bearing surface contacting said journal, a bearing rotating element in said recess, resilient means restricting movement of said element in said recess transverse to said bearing, and means on each transverse side of said recess for biasing said element between said resilient means and said journal, said resilient means providing sufficient restriction to passage of said element to induce rotation of said bearing with said journal.

6. The method of renewing the load bearing surface of a cylindrical plain bearing which comprises, rotatably supporting a cylindrical plain bearing, rotatably supporting a journal on said bearing, rotating said journal, locking said journal to said bearing to coaxially rotate said bearing therewith, limiting the rotation of said bearing relative to said bearing support to one-half revolution, and releasing said bearing from said journal by limiting movement of said bearing.

7. The method of renewing the load bearing surface of a cylindrical plain bearing which comprises, rotatably supporting a cylindrical plain bearing, rotatably supporting a journal with said bearing, rotating said journal on said bearing, frictionally engaging a bearing rotating element between said journal and said bearing to cause them to rotate together, and limiting the movement of said bearing to one-half revolution so that continued rotation of said journal releases said element from said frictional engagement.

8. In a bearing assembly, a cylindrical plain bearing for rotatably supporting a journal, means for rotatably supporting said bearing, means for limiting the rotation of said bearing relative to said bearing support means, said limiting means including a semi-circumferential groove in the surface of said bearing adjacent said support and a boss on said support projecting into said groove, means for locking said bearing to said journal for coaxial rotation therewith, and means for releasing said locked bearing from said journal by engagement of said bearing with said limiting means.

References Cited in the file of this patent

UNITED STATES PATENTS

| 1,935,546 | Dieter | Nov. 14, 1933 |
| 1,940,345 | Brownlee | Dec. 19, 1933 |

FOREIGN PATENTS

| 356,502 | Great Britain | Sept. 10, 1931 |